(12) United States Patent
Nelson et al.

(10) Patent No.: US 10,304,287 B2
(45) Date of Patent: May 28, 2019

(54) SYSTEMS AND METHODS FOR AWARDING USER ACCOUNTS ASSOCIATED WITH USERS OF A VIDEO GAME BASED ON INFORMATION THAT IS UNIQUE TO INDIVIDUAL USER ACCOUNTS

(71) Applicant: Disney Enterprises, Inc., Burbank, CA (US)

(72) Inventors: Robert Nelson, Salt Lake City, UT (US); Robert Lowe, Playa Vista, CA (US)

(73) Assignee: Disney Enterprise, Inc., Burbank, CA (US)

( * ) Notice: Subject to any disclaimer, the term of this patent is extended or adjusted under 35 U.S.C. 154(b) by 59 days.

(21) Appl. No.: 14/925,653

(22) Filed: Oct. 28, 2015

(65) Prior Publication Data
US 2017/0124804 A1  May 4, 2017

(51) Int. Cl.
*G07F 17/32* (2006.01)
*A63F 13/46* (2014.01)
*A63F 13/335* (2014.01)

(52) U.S. Cl.
CPC ........ *G07F 17/3255* (2013.01); *A63F 13/335* (2014.09); *A63F 13/46* (2014.09); *G07F 17/323* (2013.01); *G07F 17/3241* (2013.01)

(58) Field of Classification Search
None
See application file for complete search history.

(56) References Cited

U.S. PATENT DOCUMENTS

| | | | |
|---|---|---|---|
| 5,299,291 A | 3/1994 | Ruetz | |
| 8,882,595 B2* | 11/2014 | Chowdhary | A63F 13/10 463/36 |
| 2004/0059922 A1 | 3/2004 | Harris | |
| 2006/0052153 A1* | 3/2006 | Vlazny | G06Q 20/06 463/17 |
| 2006/0224456 A1* | 10/2006 | Walker | G06Q 30/02 705/14.1 |
| 2006/0277100 A1* | 12/2006 | Parham | G06Q 30/02 705/14.14 |
| 2007/0087834 A1* | 4/2007 | Moser | G06Q 30/02 463/42 |
| 2007/0093299 A1* | 4/2007 | Bergeron | G07F 17/32 463/43 |
| 2007/0139671 A1 | 6/2007 | Stevens | |

(Continued)

FOREIGN PATENT DOCUMENTS

IN  1381KOL2007  4/2009

*Primary Examiner* — James S McClellan
*Assistant Examiner* — Peter Iannuzzi
(74) *Attorney, Agent, or Firm* — Esplin & Associates, PC

(57) ABSTRACT

Users may access a virtual space and/or video game taking place in the virtual space by logging into user accounts via computing platforms. The user accounts may include values for one or more attributes of the user accounts. The user accounts may be periodically rewarded based on values included in the user accounts matching a winning value. The values in the user accounts may include account-specific values that may be unique to a corresponding user account. A winning value may be determined from a pool of account-specific values such that for a given winning value, a single winning user account may be determined.

16 Claims, 3 Drawing Sheets

(56) References Cited

U.S. PATENT DOCUMENTS

| | | | |
|---|---|---|---|
| 2007/0197275 A1* | 8/2007 | Gagner | G07F 1/06 |
| | | | 463/16 |
| 2008/0105751 A1* | 5/2008 | Landau | A63F 13/10 |
| | | | 235/492 |
| 2008/0200244 A1* | 8/2008 | Rowe | G07F 17/32 |
| | | | 463/27 |
| 2009/0176566 A1* | 7/2009 | Kelly | G07F 17/32 |
| | | | 463/29 |
| 2009/0313358 A1* | 12/2009 | Shepherd | H04L 41/5054 |
| | | | 709/221 |
| 2010/0324984 A1* | 12/2010 | Pelto | G06Q 20/06 |
| | | | 705/14.25 |
| 2011/0183754 A1 | 7/2011 | Alghamdi | |
| 2014/0100020 A1* | 4/2014 | Carroll | A63F 13/12 |
| | | | 463/25 |
| 2016/0042607 A1* | 2/2016 | McCoy | G07F 17/3255 |
| | | | 463/25 |

\* cited by examiner

SYSTEMS AND METHODS FOR AWARDING USER ACCOUNTS ASSOCIATED WITH USERS OF A VIDEO GAME BASED ON INFORMATION THAT IS UNIQUE TO INDIVIDUAL USER ACCOUNTS

FIELD OF THE DISCLOSURE

This disclosure relates to awarding user accounts associated with users of a video game based on information that is unique to individual user accounts.

BACKGROUND

Users may access virtual spaces via computing platforms by logging into respective user accounts. A virtual space may include a video game taking place in the virtual space. Awarding user accounts with virtual items and/or goods may provide a technique to keep users engaged in a video game and/or to otherwise enhance their gameplay experience. In some instances, awarding may come in the form of periodic award-giving events where awards may be given to a plurality of user accounts. For example, a daily award may be provided to user accounts of users of a video game. However, users may lose interest in such periodic events since the "winner" pool is so saturated that the users may not feel they are getting anything of substantial value, even if the awards themselves carry some value in the virtual space and/or video game. Users may also get bored of periodic awards since they may be automatically provided to the user accounts and may not require any participation by the users in order to redeem them.

SUMMARY

One aspect of the disclosure relates to a system configured for providing awards to user accounts associated with users of a video game based on information that is unique to individual ones of the user accounts. Awards may be provided to user accounts through awarding events that take place in the video game. The awarding events may include one or more potential winning user accounts based on information included in the potential winning user accounts matching predetermined winning information. In some implementations, a sole potential winner may be determined based on the winning information being information that may be unique to a single user account.

In some implementations, the awards may be provided to winning user accounts that are user accounts including information that matches the winning information (e.g., potential winning user accounts) and/or potential winning user accounts that convey satisfaction of award redemption criteria. Award redemption criteria may be associated with user accounts conveying that users satisfied performance of one or more actions (e.g., in-game and/or in the real world actions), and/or other criteria for redeeming an award. By providing awards to a single winner or very few winners, the award events may be exciting and may include awards that may be highly sought after by users of the video game. The winners may feel special if they are a sole winner or one of very few winners. As such, users may be highly engaged in the awarding events.

In some implementations, the system may comprise one or more physical processors configured to execute machine-readable instructions. The machine-readable instructions may include one or more of a user component, a space component, an award component, a potential winner component, a redemption component, a notification component, a winner component, and/or other components.

The user component may be configured to manage user accounts associated with users of a video game. Individual ones of the user accounts may include values for one or more attributes of the user accounts. Individual ones of the user accounts may include one or more account-specific values. Account-specific value may include values that may be unique to a corresponding user account. By way of non-limiting example, the user accounts may include a first user account, and/or other user accounts. The first user account may include a first account-specific value for a first attribute and/or other values for other attributes.

The award component may be configured to select one or more attributes for one or more awarding events. The award component may be configured to determine one or more winning values for the one or more selected attributes. The one or more winning values may be determined from a pool of values for the one or more selected attributes included in the user accounts. In some implementations, the pool of values may comprise account-specific values, such that a given selected winning value may correspond to a single user account. The award component may be configured to associate one or more awards with the winning values. By way of non-limiting example, the award component may be configured to select a first attribute and/or other attributes for a first awarding event. The award component may be configured to determine a first winning value and/or other winning values from a first pool of values for the first attribute. The award component may be configured to associate a first award with the first winning value.

The potential winner component may be configured to identify one or more potential winning user accounts. The potential winning user accounts may be user accounts including values for the one or more selected attributes that match the one or more winning values. In some implementations, a sole potential winning user account may be identified based on a winning value matching an account-specific value of the potential winning user account. By way of non-limiting example, the first user account may be identified as a first potential winning account for the first awarding event based on the first account-specific value matching the first winning value.

The redemption component may be configured to determine award redemption criteria for individual ones of the awarding events. A potential winning user account may convey satisfaction of award redemption criteria before the potential winning user account may be deemed a winning account. By way of non-limiting example, first award redemption criteria may be determined for the first awarding event.

The notification component may be configured to effectuate presentation of one or more notifications via computing platforms associated with the user accounts. In some implementations, notifications may include information regarding upcoming awarding events so that users may become aware of the awarding events. The notifications may include information about the awarding events including. Information about awarding events may include one or more of a time of the event, an attribute associated with the event, an award, criteria for redeeming the award, and/or other information. In some implementations, notifications may include reminders of the awarding events sent to one or more of the identified potential winners to encourage them to participate in the awarding event.

The winning component may be configured to provide the one or more awards to one or more winning user accounts based on values for the selected one or more attributes included in the one or more winning user accounts matching the one or more winning values and/or the one or more winning user accounts conveying satisfaction of award redemption criteria. By way of non-limiting example, the winning component may be configured to provide the first award to the first user account based on the first account-specific value matching the first winning value and/or the first user account conveying satisfaction of first award redemption criteria.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
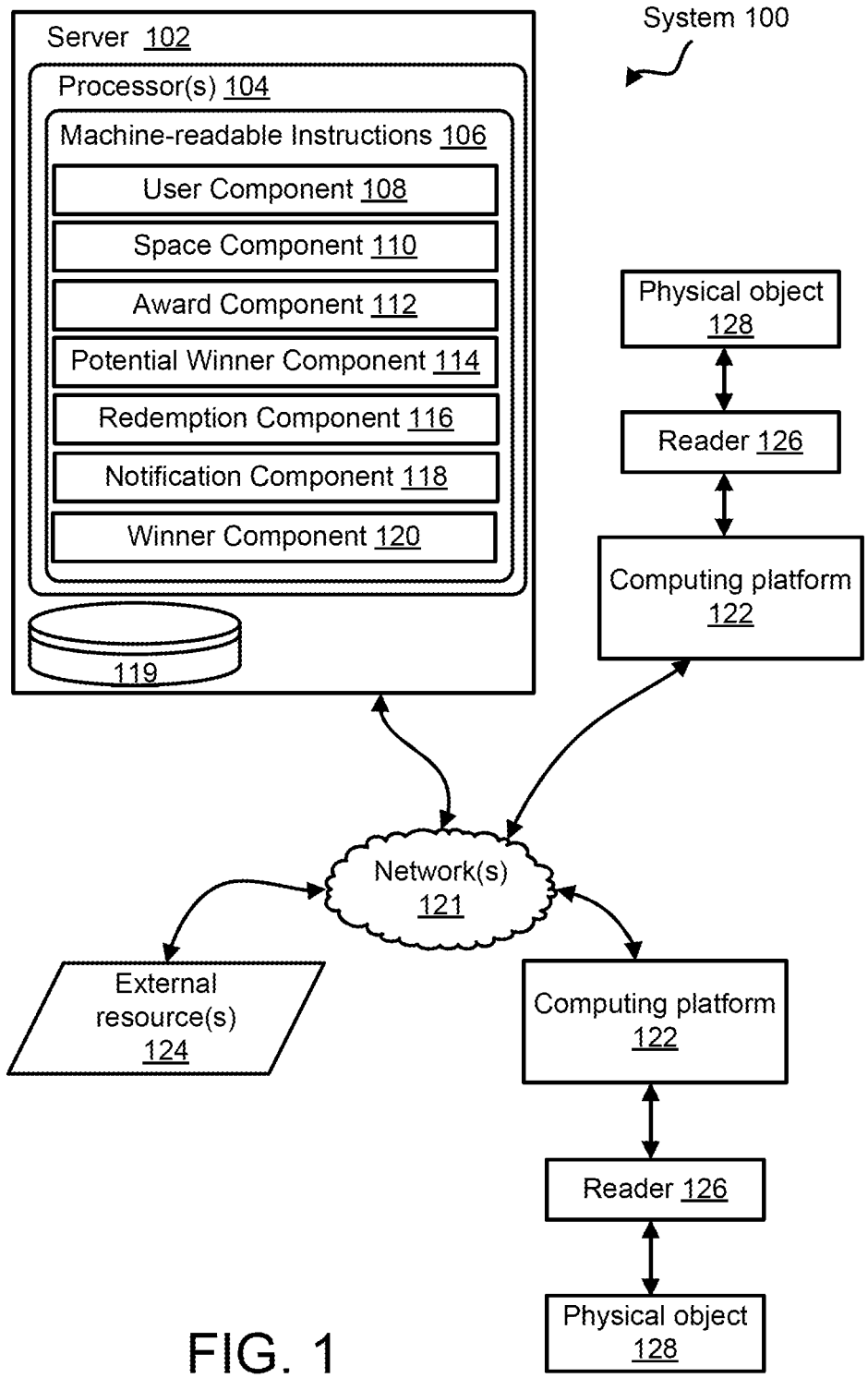
FIG. 1 illustrates a system configured for providing awards to user accounts associated with users of a video game based on information that is unique to individual ones of the user accounts, in accordance with one or more implementations.

FIG. 1 illustrates a system 100 configured for providing awards to user accounts associated with users of a video game based on information that is unique to individual ones of the user accounts, in accordance with one or more implementations. The video game may take place within a virtual space. Users may access the virtual space and/or video game using computing platforms 122 associated with the users.

The computing platforms 122 may be configured to receive identification information indicating presence of one or more physical objects 128 detected by readers 126. The identification information may be information used to identify the physical objects 128 for indicating presence (e.g., a bar code, tag ID, a serial number, a name, and/or other information). Readers 126 may communicate with computing platforms 122 via any suitable wired or wireless communication through, such as but not limited to, universal serial bus (USB), Bluetooth, parallel ports, FireWire, Infrared, 3DS reader, and/or any other suitable wired or wireless communication. The readers 126 may obtain information stored on one or more physical objects 128, such as identification information of the physical objects, and/or any other information stored on the physical objects. The readers 126 may obtain such information from the physical objects 128 through technologies such as, but not limited to RFID, NFC, Bluetooth, and/or any other communication technologies suitable for reading information stored on physical objects 128.

In FIG. 1, providing a virtual space may include hosting the virtual space over a network 121, such as the Internet. A server 102 may include one or more processors 104 configured to execute machine-readable instructions 106 to facilitate providing awards to user accounts associated with users of a video game based on information that is unique to individual ones of the user accounts. The machine-readable instructions 106 may include one or more of a user component 108, a space component 110, an award component 112, a potential winner component 114, a redemption component 116, a notification component 118, a winner component 120, and/or other components.

The server 102 may be configured to communicate with one or more computing platforms 122 according to client/server architecture, and/or other communication schemes. The computing platforms 122 may include, for example, a cellular telephone, a smartphone, a laptop, a tablet computer, a desktop computer, a television set-top box, smart TV, a gaming console, and/or other platform. The users may access system 100, a virtual space, and/or a video game via the computing platforms 122 by logging in to respective user accounts.

In some implementations, one or more features and/or functions of server 102 may be attributed to one or more computing platforms 122. By way of non-limiting example, individual ones of the computing platforms 122 may include machine-readable instructions comprising the same or similar components as machine-readable instructions 106 of server 102. The computing platforms 122 may be configured to locally implement an instance of a virtual space and/or a video game taking place within the virtual space and/or facilitate participation of one or more users in the virtual space and/or the video game.

The user component 108 may be configured to access and/or manage one or more user accounts and/or other user information associated with users of the system 100. The one or more user accounts may include information stored by server 102, one or more of the computing platforms 122, and/or other storage locations. The user accounts may include values for one or more user account attributes. User account attributes may define characteristics of the user accounts. Characteristics of the user accounts may include characteristics of users associated with the user accounts game entities associated with user accounts, and/or other entities associated with the user accounts.

A value of an attribute may describe a state of a characteristic associated with a user account. Values may correspond to the user account generally and/or to one or more game entities (or users) associated with the user account. For example, a common attribute may be experience (XP). In some implementations, different XP values may be provided for different game entities associated with a user account. For example, individual users of a user account may be individually associated with a game entity played in the video game. The game entities may individually be associated with respective values for XP and/or other attributes.

The value of a given attribute may be numerical, descriptive, progressive, pictorial, and/or any other type of value for an attribute. In some implementations, a numerical expression of a value may include one or more of a point, amount, score, rank, rating, grade, or any other type of numerical value. A descriptive expression of value may include one or more of text for name, location, physical object, role, and/or other description. A progressive expression for a value may include one or more of high, medium, low, and/or other progressive description. A pictorial expression of a value may include one or more of an image representing a class of a user account, and/or other imagery.

User accounts may include account-specific values for one or more attributes. The account-specific values may be unique to individual ones of the user accounts. By way of non-limiting example, a first user account may be associated with a first attribute. The first user account may include a first value for the first attribute. The first value may be an account-specific value that may be unique to the first user account. In some implementations, the first value may be unique to only the first user account. In some implementations, the first value may be unique to the first user account and/or one or more other user accounts.

In some implementations, user account attributes may correspond to one or more of user identification within the virtual space, security login information, subscription information, virtual (or real) currency account information, virtual inventory information, relationship information, virtual space usage information, participation information, demographic information associated with users, interaction history among users in the virtual space, information stated by users, a phone number associated with a user, a physical object identification, a computing platform identification, a physical location of a computing platform associated with a user account, biometric readings of users of the user accounts, game entity information, experience points (XP), a reputation score, a rank, a skill score, a level of knowledge, average spending, a role, a class, alliance(s), friend(s), health (e.g., hit points), strength, power, speed, level, appearance, and/or other attributes.

In some implementations, one or more attributes related to user identification may include one or more of a username attribute, a gender attribute, a home address attribute, user preferences attribute, and/or other information. By way of non-limiting example, one or more values for a username attribute may include one or more of handle, a number, an identifier, a serial number, a name, and/or other information.

In some implementations, one or more values for security login information attribute may include one or more of a login code, password, security question/answer, and/or other information.

In some implementations, one or more values for a virtual (or real) currency account attribute may describe one or more of an amount of currency held in credit for a user, a type of currency held, and/or other information.

In some implementations, one or more values for a virtual inventory attribute may describe of one or more virtual items available to the users in the virtual space and/or video game, and/or other information.

In some implementations, one or more values for a relationship attribute may describe one or more relationships between users in the virtual space and/or other information.

In some implementations, one or more values for a virtual space usage attribute may describe a frequency of log-in, a velocity of log-in, an amount of times a user logged in to a user account, whether or not a user is currently logged in, a time that a user has logged in, and/or other information. By way of non-limiting example, a value for a virtual space usage attribute may describe that a user may be currently logged in, a time at which the user logged in, and/or other information.

In some implementations, one or more values for a participation attribute may convey activities of the user accounts and/or other information. By way of non-limiting example, a value for a participation attribute may include information indicating current activities of the user, activity histories of the users, and/or other information. By way of non-limiting example, a value for a participation attribute may convey that a user may currently be providing a physical object to a reader of a computing platform for detection by the reader. The value may also record the time at which the user may have provided the physical object, an identification of the physical object, and/or other information. By way of non-limiting example, a value for a participation attribute may convey that a user may currently be participating in a gameplay event, completing in-game tasks, and/or participating in the video game in other ways.

In some implementations, one or more values for a physical object identification attribute may include information used to identify one or more physical objects associated with a user account. In some implementations, a value for a physical object identification attribute may include information identifying a physical object currently detected by a reader of a computing platform. In some implementations, values for a physical object identification attribute may include a list of physical objects historically detected by readers of computing platforms used to log into a user account. A value may include one or more of a bar code, tag ID, a serial number, a name, a SKU, and/or other information.

In some implementations, one or more values of a computing platform identification attribute may include information used to identify a computing platform associated with a user account. In some implementations, a value for a computing platform identification attribute may include information identifying a computing platform currently used to access a user account. In some implementations, values for a computing platform identification attribute may include a list of computing platforms historically used to log in to a user account. In some implementations, a value for a computing platform identification attribute may include one or more of a serial number, an IP address, a MAC address, and/or other information.

In some implementations, one or more values for a computing platform location attribute may include information used to describe locations of a computing platform associated with the user account. In some implementations, a value for a computing platform location attribute may include information describing a current location of a computing platform used to access a user account. In some implementations, values for a computing platform location attribute may include a list of locations associated with past access to a user account. In some implementations, a value for a computing platform location attribute may include one or more of a name of a location, a coordinate, a latitude, a longitude, a zip code, an area code, and/or other information. In some implementations, location may be determined based on one or more location sensors operatively coupled to or included with the computing platforms 122. By way of non-limiting example, the computing platforms 122 may include one or more of a GPS device, other location sensor, and/or may employ other techniques for determining a physical location of a computing platform.

In some implementations, one or more values for a biometric reading attribute may include information describing biometric makers of one or more users of a user account. In some implementations, a value for a biometric reading attribute may include information describing a current reading of a biometric marker of a user of a user account. In some implementations, values for a biometric reading attribute may include a list of descriptions of biometric markers associated with past readings by a user. In some implementations, biometric readings may be obtained by one or more biometric sensors and/or readers operatively coupled to or included with a computing platform used by a user to access a user account. By way of non-limiting example, a biometric sensor and/or reader may include one or more of a camera (e.g., facilitating iris and/or face detection), a fingerprint scanner, a microphone (e.g., facilitating voice recognition), and/or other devices capable of reading biometric markers of a user.

In some implementations, individual game entities may be associated with one or more attributes that includes values specific to the given game entity. By way of non-limiting example, a game entity may be associated with one or more of a name attribute, an experience point attribute, a reputation attribute, a rank attribute, a skill score attribute, a level of knowledge attribute, a role attribute, a class attribute, alliance(s) attribute, health attribute, strength attribute, power attribute, speed attribute, level attribute, appearance attribute, and/or other attribute of a game entity. By way of non-limiting example, a value for a name attribute of a game entity may be "Buzz Lightyear," and/or other values. A value for a health attribute for the game entity may be "100 hit-points," and/or other values.

The above descriptions of attributes and/or values are provided for illustrative purposes only. As such, it is not to be considered limiting with respect to types of attributes and/or how attribute values may be expressed.

Figure 2:
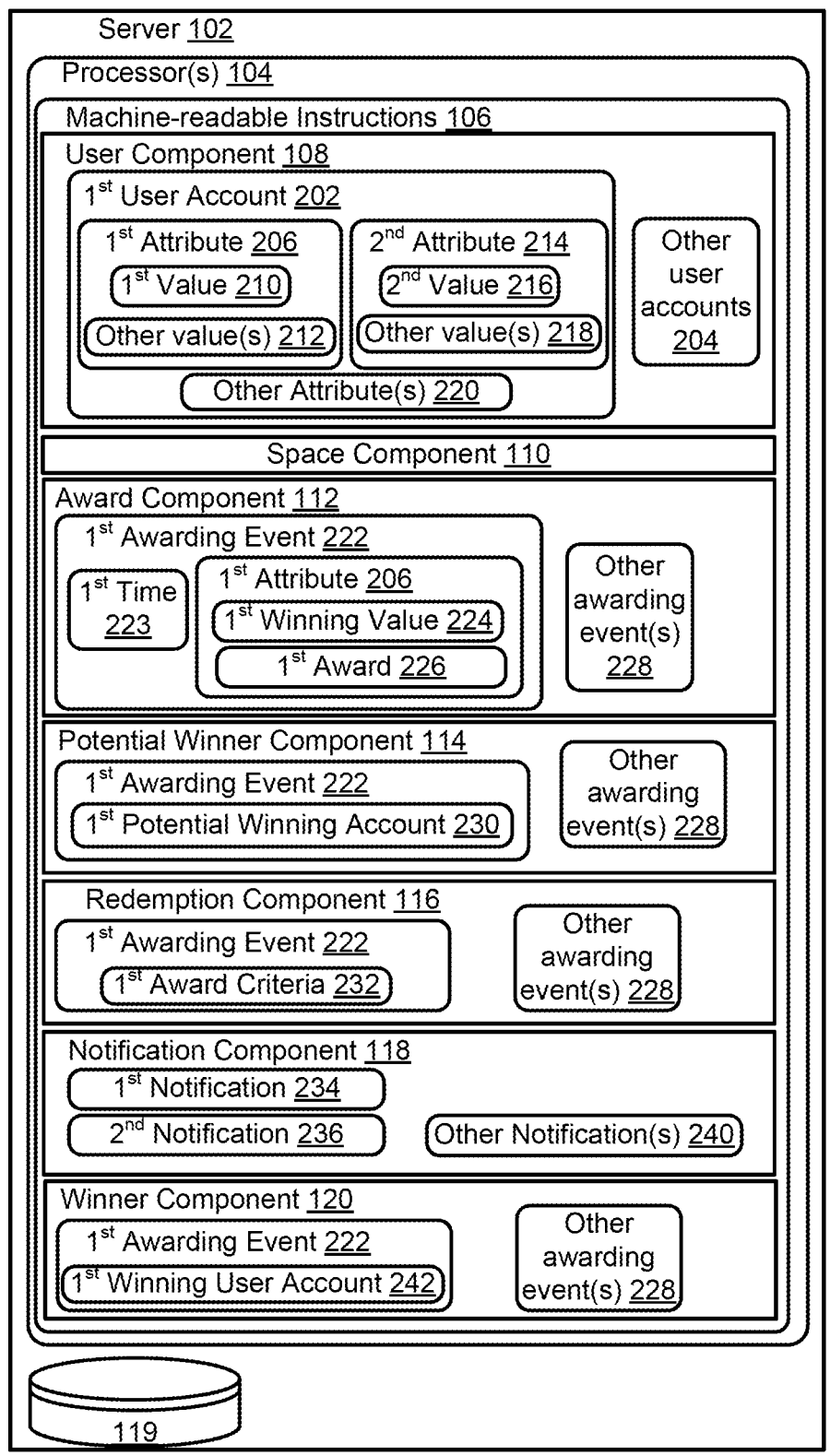
FIG. 2 illustrates an implementation of a server employed in the system of FIG. 1.

By way of illustration in FIG. 2, the user component 108 may be configured to manage a first user account 202 and/or other user accounts 204. The first user account 202 may include one or more values for a first attribute 206, a second attribute 214, and/or other attributes 220. The first user account 202 may include a first value 210 and/or other values 212 for the first attribute 206. The first user account 202 may include a second value 216 and/or other values 218 for the second attribute 214. By way of non-limiting example, the first attribute 206 may be a physical object identification attribute. The first value 210 may include a serial number of a physical object associated with the first user account 202. The other values 212 may include serial numbers for other physical objects associated with the first user account 202. In some implementations, the second attribute 214 may be a participation attribute. The second value 216 may convey one or more of a physical object identified by the first value 210 currently being detected by a first reader operatively coupled to or included with a first computing platform used to access the first user account 202, a time at which the physical object was detected by the reader, and/or other information.

Returning to FIG. 1, the space component 110 may be configured to implement an instance of the virtual space executed by the computer components to determine state of the virtual space. The state may be communicated (e.g., via streaming visual data, object/position data, and/or other state information) from server 102 to computing platforms 122 for presentation on displays of the computing platforms 122. The state determined and transmitted to a given computing platform 122 may correspond to a view for a game entity being controlled by user input via input devices (e.g., a controller, touch-responsive display screen, and/or other input device) at the given computing platform 122. The state determined and presented to a given computing platform 122 may correspond to a location in the virtual space (e.g., location in the game). The view described by the state for the given computing platform 122 may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the virtual space may comprise a simulated space that is accessible to users via clients (e.g., computing platforms 122) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the virtual space is determined by space component 110 is not intended to be limiting. The space component 110 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may provide input to control game entities, simulated physical phenomena (e.g., wind, rain, earthquakes, and/or other phenomena), and/or other elements within the virtual space to interact with the virtual space and/or each other. The game entities may include virtual characters such as avatars. A game entity may be controlled by the user with which it is associated. The game entities may be associated with physical objects 128. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the virtual space.

In some implementations, individual ones of the game entities may be associated with physical objects 128. The physical objects 128 may store information about the associated game entities. The physical objects 128 may be physical representations of the game entities associated therewith. A given physical object may be a toy figurine embodying the appearance of an associated game entity. In some implementations, physical objects 128 may be detectable by computing platforms 122 via readers 126 that may be operatively coupled to or included with the computing platforms 122. The readers 126 may facilitate communication and/or information exchange between the physical objects 128 and the computing platforms 122. By way of non-limiting example, physical objects 128 communicating with a reader 126 may be configured to obtain information associated with a game entity from the computing platform 122 based on most recent use of the game entity in the video game executed by the computing platform 122 and/or server 102. Physical objects 128 may be configured to provide information to a computing platform 122 via a reader 126 such that the computing platform 122 may implement an instance of the video game based on information stored by the physical objects 122.

The users may interact with each other through communications exchanged within the virtual space. Such communications may include one or more of textual chat, instant messages, private messages, voice communications, and/or other communications. Communications may be received and entered by the users via their respective computing platforms 122. Communications may be routed to and from the appropriate users through server 102 (e.g., through space component 110) and/or through communications which are external to the system 100 (e.g., text messaging services associated with the computing platforms 122).

Users may participate in the instance of the virtual space by participating in one or more gameplay events. Gameplay events in the video game include one or more of a tournament, match, campaign, battle, siege, and/or other considerations of gameplay events where performance relative to other users may be quantitatively measured. In some implementations, gameplay events may comprise single player events where a user's performance may be measured against themselves and/or a "shadow" non-player character.

The users may participate in the instance of the virtual space via one or more awarding events (see, e.g., the award component 112). Awarding events may correspond to periodic events where one or more winning user accounts may be awarded one or more virtual objects and/or other awards. One or more potential winning user accounts may be identified based on values of one or more attributes included in the potential winning user accounts matching winning values for the one or more attributes. The users may be notified of award redemption criteria that must be satisfied in order to receive an award. In some implementations, one or more of the potential winning accounts may be provided an award based on one or more of the potential winning accounts conveying satisfaction of award redemption criteria. Award events may take place at one or more specified times and/or over one or more specified time periods.

The instance of the virtual space and/or the video game that takes place therein may be persistent. That is, the virtual space and/or the video game may continue on whether or not individual players are currently logged in and/or participating in the game. A player who logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes in wait periods of timed in-game tasks, changes experienced by non-player characters, changes to the virtual objects available for use in the video game, and/or other changes.

Virtual objects may include virtual items and/or goods. Virtual items and/or goods may include one or more of a virtual weapon, a tool, a virtual resource (e.g., a food, a currency, health, a potion, a power up, an upgrade, and/or other resource), a reward, a bonus, an enhancement, a mount, a speed-up, clothing, a vehicle, an anatomical feature of a game entity, a troop or troop type, a pet, and/or other virtual items and/or goods. Game entities may include one or more of a virtual character, group of characters, a virtual object, a battalion, a clan, a unit, a village, an army, a troop, and/or other entity.

The award component 112 may be configured to determine one or more awarding events that may take place in a video game. In some implementations, award events may be specified by a provider, administrator, moderator, and/or any other entities related to the virtual space and/or video game. The awarding events may be determined to take place at one or more specified times and/or over one or more specified time periods. In some implementations, award events may take place periodically. By way of non-limiting example, a first awarding event may start at a first time and/or take place over a first time interval following the first time. By way of non-limiting example, a first awarding event may take place every third Wednesday of the month from 1 pm to 3 pm, and/or at other times. In some implementations, an awarding event may end based on one or more winning user accounts being determined, a time interval expiring, input from a provider, administrator, moderator, and/or other entity, and/or based on other criteria.

In some implementations, awarding component 112 may be configured to select one or more attributes to be associated with an awarding event. The awarding component 112 may be configured to select one or more attributes from a pool of attributes. By way of non-limiting example, a pool of attributes may include all possible attributes of a user account. In some implementations, a pool of attributes may include one or more attributes for which account-specific values may be included. By way of non-limiting example, a first attribute may be selected for a first awarding event.

In some implementations, an attribute for which account-specific values may be included may be a physical object identification attribute and/or other attributes. For example, physical objects may have unique identifications (e.g., serial numbers). As such, a given value from a pool of values of known physical object identification values may be an account-specific value that is unique to an individual user account. Other attributes for which account-specific values may be included in the user account such that the account-specific values are unique to a corresponding user account are also contemplated. By way of non-limiting example, other attributes for which account-specific values may be included may be a user identification attribute, computing platform identification attribute, biometric reading attribute, and/or other attributes.

In some implementations, an attribute for which account-specific values may not be included may be an experience points attribute, and/or other attribute. For example, many users may have a given value of an experience points attribute such that the given value of the experience points attribute may not be unique to any one user account. Other attributes for which no account-specific values may be included in the user account such that the account-specific values are not unique to a corresponding user account are also contemplated. By way of non-limiting example, other attributes for which account-specific values may not be included may include a name attribute for game entities, class attribute, role attribute, gender attribute and/or other attributes.

In some implementations, awarding component 112 may be configured to select a combination of attributes to be associated with an awarding event. In some implementations, pools of values for the attributes included in the combination may not individually include values that may be unique to a given user account. However, a combination of values selected from the pools may be unique to one or more user accounts. By way of non-limiting example, a first attribute, a second attribute, and/or other attributes may be selected. Among the plurality of user accounts associated with the video game, there may not be any one value of the first attribute or the second attribute that may be unique to a given user account. However, a combination of a first value of the first attribute and second value of the second attribute may be unique to one or more user accounts.

In some implementations, the awarding component 112 may be configured to determine one or more winning values for the one or more selected attributes. The one or more winning values may be determined from a pool of values. The pool of values may include the values for the one or more selected attributes included in one or more user accounts, all user accounts, a select group of user accounts, and/or other values. By way of non-limiting example, among one or more user accounts of the video game, a pool of values for a first attribute may be determined (e.g., via user component 108). The award component 112 may be configured to determine one or more winning values from the pool of values. In some implementations, the number of winning values determined may correspond to the number of potential winners of the awarding event.

In some implementations, the awarding component 112 may be configured to determine one or more winning values stochastically, based on input provided by a provider, administrator, moderator, and/or any other entities related to the virtual space and/or video game, and/or determined in other ways. By way of non-limiting example, a first winning value may be stochastically determined from a pool of values associated with a selected attribute of an awarding event.

By way of non-limiting illustration in FIG. 2, the awarding component 112 may be configured to determine a first awarding event 222 and/or other awarding events 228 to take place in a video game. The first awarding event 222 may be determined to start at a first time 223. The first awarding event 222 may be restricted to a time period (not shown in FIG. 2), may end when a winner is determined, and/or may end based on other criteria. The first awarding event 222 may be a periodically occurring event. The awarding component 112 may be configured to select the first attribute 206 for the first awarding event 222. The awarding component 112 may be configured to determine a first winning value 224 for the first attribute 206. The first winning value 224 may be determined from a first pool of values of the first attribute 206. The awarding component 112 may be configured to associate a first award 226 with the first winning value 224.

By way of non-limiting example, the first attribute 206 may correspond to physical objects associated with the user accounts. The first pool of values for the first attribute 206 may include the unique identifications of the physical objects associated with the user accounts. By way of non-limiting example, the first pool may include a list of physical object serial numbers, and/or other values.

By way of non-limiting example, the first attribute 206 may correspond to biometrics associated with the users of the user accounts. The first pool of values for the first attribute 206 may include unique information derived from readings of biometric markers of the users of the user accounts. By way of non-limiting example, the first pool may include a list of serial numbers and/or other unique information derived from fingerprint scans of the users, and/or other values.

By way of non-limiting example, the first attribute 206 may correspond to the identifications of user accounts associated with the users. The first pool of values for the first attribute 206 may include unique identifications of the user accounts. By way of non-limiting example, the first pool may include a list of usernames and/or other values.

Returning to FIG. 1, the potential winner component 114 may be configured to identify one or more potential winning user accounts. The potential winning user accounts may be user accounts that include values for the selected attributes that match the one or more winning values for the selected attributes. In some implementations, an individual user account may be identified as a sole potential winning user account based on an account-specific value of a selected attribute matching a winning value for a selected attribute. In some implementations, one or more user accounts may be determined to be potential winning user accounts based on values for one or more selected attributes matching one or more winning values for the selected attributes.

By way of non-limiting illustration in FIG. 1, the potential winner component 114 may be configured to identify a first potential winning account 230 and/or other potential winning accounts for the first awarding event 222. The first potential winning account 230 may be a user account having a value for the first attribute 206 that matches the first wining value 224. By way of non-limiting example, the first potential winning account 230 may be the first user account 202 based on the first value 210 matching the first winning value 224.

Returning to FIG. 1, the redemption component 114 may be configured to determine award redemption criteria of the awarding events. Award redemption criteria may have to be satisfied in order for a potential winning account to be a winning account for redeeming an award. Award redemption criteria may correspond to user accounts conveying certain user activity and/or other information. In some implementations, award redemption criteria may include one or more of a user account conveying a user log-in before, after, and/or during a start of an awarding event, a user account conveying particular user action before, after, or during an awarding event, and/or a user account conveying other activity by a user of the user account.

In some implementations, activity of a user account may be determined based on values of one or more attributes of a user account. By way of non-limiting example, a user account conveying a user log in may be determined based on a value for a usage attribute describing that a user is logged in and/or a time a user has logged into the user account. By way of non-limiting example, a user account conveying particular user action may be determined based on a value for a participation attribute conveying a name and/or time of a gameplay event, an in-game task, a real-world task (e.g., providing a physical object for detection by a reader, providing a biometric marker for reading by a biometric sensor, and/or other tasks) and/or other action performed by the user. Activity of a user account may be determined based on other values of one or more other attributes, and/or other information.

By way of non-limiting illustration in FIG. 2, the redemption component 116 may be configured to determine first award redemption criteria 232 and/or other award redemption criteria for the first awarding event 222. The first award redemption criteria 232 may be associated with user accounts conveying satisfaction of certain activity performed by a user of the user accounts. By way of non-limiting example, the first award redemption criteria 232 may correspond to providing physical objects for detection by a reader operatively coupled to or included with a computing platform before, during, and/or after the first time 223 of the first awarding event 222.

By way of non-limiting example, the first award redemption criteria 232 may correspond to the user accounts conveying users are logged into the user accounts at one or more specified times. For example, by virtue of the first user account 202 conveying user log-in to the first user account 202 at the first time 223, the first award redemption criteria 232 may be satisfied.

By way of non-limiting example, the first award redemption criteria 232 may correspond to the user accounts conveying detection of physical objects by readers operatively coupled to or included in computing platforms associated with the user accounts at one or more specified times. For example, by virtue of the first user account 202 conveying detection of a first physical object by a first reader operatively coupled to or included with a first computing platform associated with the first user account 202 at the first time 223, the first award redemption criteria 232 may be satisfied.

By way of non-limiting example, the first award redemption criteria 232 may correspond to the user accounts conveying biometric readings of biometric markers of the users at one or more specified times. For example, by virtue of the first user account 202 conveying a first biometric reading of a first biometric marker of a first user of the first user account 202 at the first time 223, the first award redemption criteria 232 may be satisfied.

Returning to FIG. 1, the notification component 118 may be configured to effectuate presentation of one or more notifications to one or more computing platforms 122 associated with user accounts. In some implementations, notifications may be communicated through in-game messaging channels (e.g., an in-game messaging feed and/or chat). In some implementations, notifications may be communicated through channels which may be external to the system 100 (e.g., text messaging services associated with the computing platforms 122).

One or more notifications may include information describing upcoming awarding events, ongoing awarding events, and/or other information. A notification describing an upcoming awarding event may include information such as a time and/or time period associated with the awarding event, an attribute associated with the awarding event, an award associated with the awarding event, award redemption criteria associated with the awarding event, and/or other information. In some implementations, notifications may be targeted to one or more identified potential winning user accounts. By way of non-limiting example, targeted notifications may be used to encourage a potential winner to participate in an awarding event. In some implementations, a targeted notification may convey that the recipient user has been identified as a potential winner. In some implementations, a targeted notification may not convey a reminder about an event, with or without "hinting" to the user account being a potential winner.

In some implementations, a notification describing an upcoming awarding event may be communicated to one or more computing platform associated with one or more users, one or more specified groups of users, and/or other computing platforms. By way of non-limiting example, if a selected attribute of an awarding events is an attribute shared by all users accounts (e.g., a user identification attribute), then a notification of the awarding event may be communicated to all computing platforms associated with all user accounts. By way of non-limiting example, if a selected attribute of an awarding event is an attribute shared by a certain group of user accounts (e.g., user accounts including specified values for a game entity name attribute), then a notification of the awarding event may be communicated to a group of computing platforms associated with the group of user accounts.

By way of non-limiting example, a first notification may include a first time associated with a first awarding event, a first attribute, a first award, first award redemption criteria, and/or other information. By way of non-limiting example, the first awarding event and first attribute may be associated with a winning value selected from a pool of values for a username attribute, and/or other attributes. The first time may be "Noon on April 1," and/or other time. The first award may be an "upgrade," and/or other award. First reward criteria may include logging into a user account at the first time. A notification may include "At noon on April 1, log in to your user account to see if you win an upgrade!"

By way of non-limiting example, the first awarding event may be associated with a winning value from a pool of values for a physical object identification attribute for physical objects that correspond to a game entity having a predetermined appearance value (e.g., Buzz Lightyear). The first time may be "1 pm on April 2," and/or other time. The first award may be an "astro-blaster," and/or other award. First reward criteria may include providing physical objects for detections by readers at the first time. A notification may include "At 1 pm on April 2, place your Buzz Lightyear figurines on your readers to see if you win an astro-blaster!"

In some implementations, targeted notifications may be communicated to one or more identified potential winning user accounts. The targeted notifications may be used to encourage a potential winner to participate in an awarding event. In some implementations, a targeted notification may convey to the recipient that their user account has been identified as a potential winner. In some implementations, a targeted notification may convey a reminder about an event, with or without conveying that the recipient user account may be a potential winner. By way of non-limiting example, a targeted notification may include "Don't forget to log in at noon on April 1, we have a feeling you might be a winner!"

By way of non-limiting illustration in FIG. 2, the notification component 118 may be configured to effectuate presentation of a first notification 234, a second notification 236, and/or other notifications 240. In some implementations, the first notification 234 may include information regarding the first awarding event 222. In some implementations, the first notification 234 may communicated for presentation on one or more computing platforms of one or more user accounts to inform the users of the user accounts of the upcoming first awarding event 222. In some implementations, the second notification 236 may include information reminding one or more users of the first awarding event 222. By way of non-limiting example, the second notification 236 may be communicated for presentation on a first computing platform associated with the first user account 202, and/or other computing platforms associated with the first user account 202 and/or other user accounts. For example, the second notification 236 may be communicated for presentation on the first computing platform based on the first user account 202 being identified as a potential winning user account.

Returning to FIG. 1, the winner component 120 may be configured to determine one or more winning user accounts based on the one or more potential winning user accounts conveying satisfaction of award redemption criteria. The winner component 120 may be configured to determine one or more winning user accounts based on values for the selected one or more attributes included in one or more user accounts matching the one or more winning values (e.g., the identified potential winning user accounts) and/or one or more user accounts conveying satisfaction of award redemption criteria.

In some implementations, the winner component 120 may be configured to provide the one or more awards to the one or more winning user accounts. Providing the one or more awards may include updating virtual inventories of the winning user accounts to reflect the one or more awards and/or instances of the one or more awards.

By way of non-limiting illustration in FIG. 2, the winner component 120 may be configured to determine a first winning user account 242 and/or other winning user accounts for the first awarding event 222. The winner component 120 may be configured to provide the first award 226 to the first winning user account 242 by updating a virtual inventory of items associated with the first winning user account 242 to include the first award 226 and/or an instance of the first award 226. By way of non-limiting example, the first award 226 may be provided to the first user account 202 based on the first value 210 matching the first winning value 224 and/or the first user account 202 conveying satisfaction of first award redemption criteria 232. By way of non-limiting example, second value 216 of the second attribute 214 may convey satisfaction of the first award redemption criteria 232.

Returning to FIG. 1, the server 102, computing platforms 122, and/or external resources 124 may be operatively linked via one or more electronic communication links. For example, such electronic communication links may be established, at least in part, via a network 121 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts, and/or providers of virtual spaces outside of system 100, external entities participating with system 100, external entities for player-to-player communications, and/or other resources. In some implementations, some or all of the functionality attributed herein to external resources 124 may be provided by resources included in system 100.

The server 102 may include electronic storage 119, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 119 may comprise electronic storage media that electronically stores information. The electronic storage media of electronic storage 119 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, 116, 118, and/or 120. Processor 104 may be configured to execute components 108, 110, 112, 114, 116, 118, and/or 120 by software; hardware; firmware; some combination of software, hardware, and/or firmware; and/or other mechanisms for configuring processing capabilities on processor 104.

It should be appreciated that although components 108, 110, 112, 114, 116, 118, and/or 120 are illustrated in FIG. 1 as being co-located within a single processing unit, in implementations in which processor 104 includes multiple processing units, one or more of components 108, 110, 112, 114, 116, 118, and/or 120 may be located remotely from the other components. The description of the functionality provided by the different components 108, 110, 112, 114, 116, 118, and/or 120 described above is for illustrative purposes and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, 120 and/or other components. As another example, processor 104 may be configured to execute one or more additional components that may perform some or all of the functionality attributed below to one of components 108, 110, 112, 114, 116, 118, and/or 120.

Figure 3:
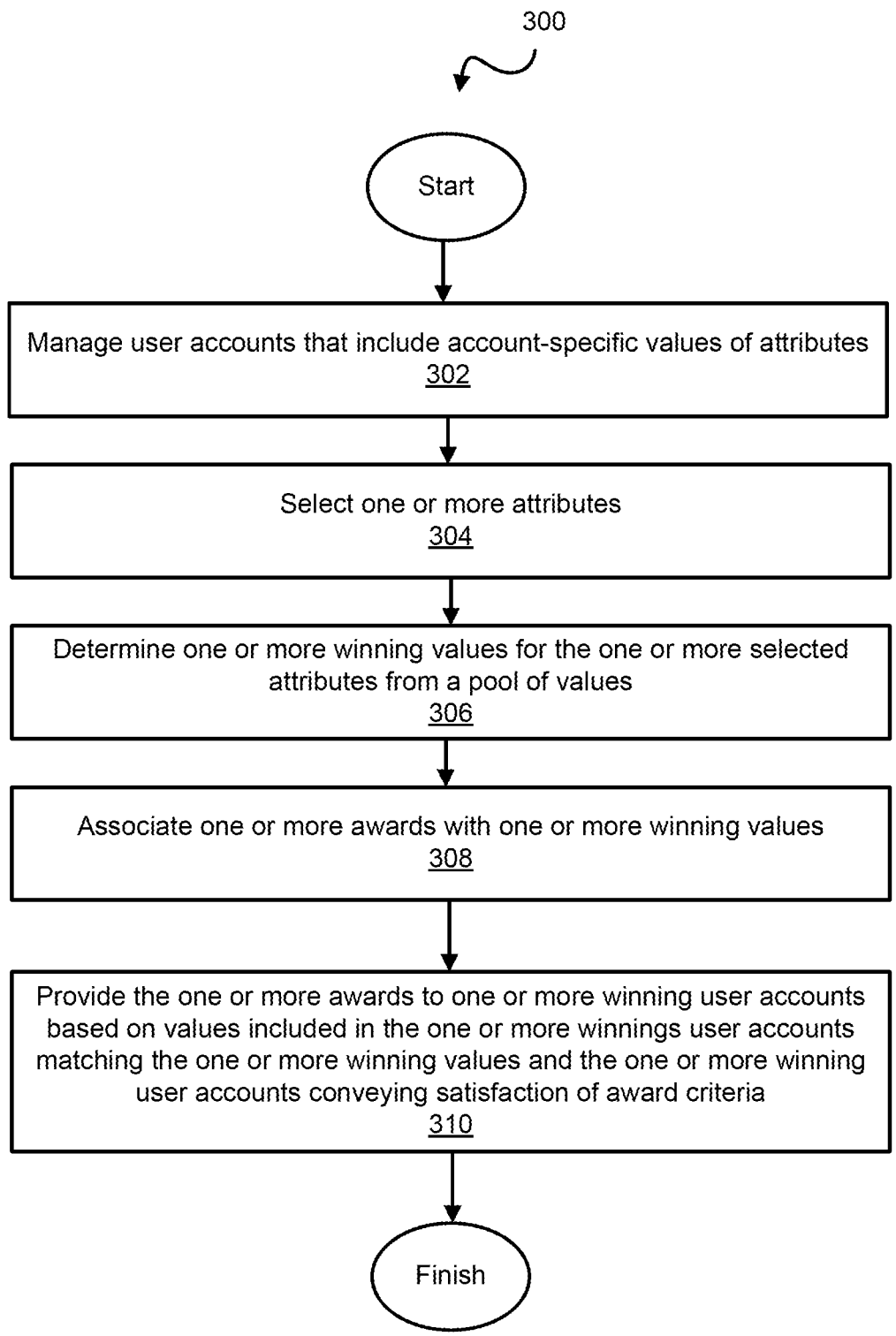
FIG. 3 illustrates a method of providing awards to user accounts associated with users of a video game based on information that is unique to individual ones of the user accounts, in accordance with one or more implementations.

FIG. 3 illustrates a method 300 providing awards to user accounts associated with users of a video game based on information that is unique to individual ones of the user accounts. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on electronic storage medium. The one or more processing devices may include one or more devices configured through hardware, firmware, and/or software to be specifically designed for execution of one or more of the operations of method 300.

At an operation 302, user accounts associated with the users of a video game may be managed. Individual ones of the user accounts may include values for one or more attributes. Individual ones of the user accounts include one or more account-specific values that are unique to the corresponding user account. The user accounts may include a first user account. The first user account may include a first account-specific value for a first attribute. In some implementations, operation 302 may be performed by a user component the same as or similar to user component 108 (shown in FIG. 1 and described herein).

At an operation 304, one or more attributes may be selected for an awarding event. By way of non-limiting example, a first attribute may be selected for a first awarding event. In some implementations, operation 304 may be performed by an award component the same as or similar to the award component 112 (shown in FIG. 1 and described herein).

At an operation 306, one or more winning values for the one or more selected attributes may be determined. The one or more winning values may be determined from a pool of values for the one or more selected attributes included in the user accounts. By way of non-limiting example, the determined one or more winning values may include a first winning value determined from a first pool of values for the first attribute. In some implementations, operation 306 may be performed by an award component the same as or similar to the award component 112 (shown in FIG. 1 and described herein).

At an operation 308, one or more awards may be associated with the one or more winning values. By way of non-limiting example, a first award may be associated with the first winning value. In some implementations, operation 308 may be performed by an award component the same as or similar to the award component 112 (shown in FIG. 1 and described herein).

At an operation 310, the one or more awards may be provided to one or more winning user accounts. The awards may be provided based on values for the selected one or more attributes included in the one or more winning user accounts matching the one or more winning values and/or the one or more winning user accounts conveying satisfaction of award redemption criteria. By way of non-limiting example, the first award may be provided to the first user account based on the first account-specific value matching the first winning value and/or the first user account conveying satisfaction of the first award redemption criteria. In some implementations, operation 310 may be performed by a winner component the same as or similar to the winner component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to provide awards to user video game accounts associated with users of a video game based on information that is unique to individual ones of the user video game accounts, the system comprising:

one or more physical processors configured by computer-readable instructions to:

manage user video game accounts associated with users of a video game, user participation in the video game including controlling associated game entities within the video game, individual ones of the user video game accounts including values for one or more attributes, wherein individual ones of the user video game accounts include one or more account-specific values that are unique to the corresponding user video game account, the one or more attributes including a physical object identification attribute, individual values of the physical object identification attribute included in the individual user video game accounts specifying individual unique identifications of individual physical objects associated with the individual user video game accounts, the individual physical objects being associated with individual game entities and embodying a visual appearance of the associated individual game entities, the individual physical objects being detectable by readers operatively coupled to or included in computing platforms used to access the video game, wherein the individual physical objects are associated with individual game entities by virtue of the detection of the individual physical objects causing the associated individual game entities to be instantiated into the video game, the user video game accounts including;

a first user video game account of a first user, the first user video game account including a first account-specific value for a first attribute, the first attribute being the physical object identification attribute, the first account-specific value specifying a first unique identification of a first physical object, the first physical object being associated with a first game entity such that the first physical object embodies a visual appearance of the first game entity and causes, based on detection of the first physical object by an individual reader coupled to or included in an individual computing platform, the first game entity to be instantiated into the video game;

select one or more attributes, the selected one or more attributes including the first attribute;

determine one or more winning values for the one or more selected attributes, the one or more winning values determined from a pool of values for the one or more selected attributes included in the user video game accounts, the determined one or more winning values including a first winning value determined from a first pool of values for the first attribute, the first pool of values including values for the first attribute included in the user video game accounts of multiple users such that the first pool of values includes a pool of unique identifications of physical objects associated with the user video game accounts of the multiple users;

associate one or more awards with one or more winning values, including associating a first award with the first winning value; and provide the one or more awards to one or more winning user video game accounts based on values for the selected one or more attributes included in the one or more winning user video game accounts matching the one or more winning values and the one or more winning user video game accounts conveying satisfaction of award redemption criteria, such that the first award is provided to the first user video game account based on the first account-specific value matching the first winning value and the first user video game account conveying satisfaction of first award redemption criteria, the first award redemption criteria including the user video game accounts conveying detection, at one or more specified times, of the physical objects by the readers operatively coupled to or included in the computing platforms used to access the video game, such that responsive to the first user video game account conveying detection of the first physical object by a first reader operatively coupled to or included with a first computing platform at a first specified time, the first award redemption criteria is satisfied.

2. The system of claim 1, wherein the one or more physical processors are further configured by computer-readable instructions such that one of the selected one or more winning values corresponds to only one user video game account.

3. The system of claim 1, wherein the one or more physical processors are further configured by computer-readable instructions to:
identify one or more potential winning user video game accounts, the potential winning user video game accounts including values for the one or more selected attributes that match the one or more winning values for the one or more selected attributes, such that the first user video game account is identified as a first potential winning account based on the first account-specific value matching the first winning value.

4. The system of claim 1, wherein the one or more physical processors are further configured by computer-readable instructions such that the one or more attributes further include a biometric reading attribute, values of the biometric reading attribute specifying information derived from readings of biometric markers of the users of the user video game accounts, and wherein a second pool of values for the biometric reading attribute includes unique information derived from readings of biometric markers of the multiple users.

5. The system of claim 1, wherein the one or more physical processors are further configured by computer-readable instructions such that the one or more attributes further include a user identification attribute, values of the user identification attribute specifying unique identifications of the user video game accounts associated with the users, and wherein a second pool of values for the user identification attribute includes unique identifications of the user video game accounts.

6. The system of claim 1, wherein the one or more physical processors are further configured by computer-readable instructions such that the award redemption criteria further includes the user video game accounts conveying users are logged into the user video game accounts at one or more specified times.

7. The system of claim 1, wherein the one or more physical processors are further configured by computer-readable instructions such that the award redemption criteria further includes the user video game accounts conveying biometric readings of biometric markers of the users at one or more specified times.

8. The system of claim 1, wherein the one or more physical processors are further configured by computer-readable instructions such that the awards are provided to one or more winning user video game accounts in accordance with periodic awarding events that take place in the video game.

9. A method to provide awards to user video game accounts associated with users of a video game based on information that is unique to individual ones of the user video game accounts, the method being implemented in a computer system including one or more physical processors and storage media storing machine-readable instructions, the method comprising:
managing user video game accounts associated with users of a video game, user participation in the video game including controlling associated game entities within the video game, individual ones of the user video game accounts including values for one or more attributes, wherein individual ones of the user video game accounts include one or more account-specific values that are unique to the corresponding user video game account, the one or more attributes including a physical object identification attribute, individual values of the physical object identification attribute included in the individual user video game accounts specifying individual unique identifications of individual physical objects associated with the individual user video game accounts, the individual physical objects being associated with individual game entities and embodying a visual appearance of the associated individual game entities, the individual physical objects being detectable by readers operatively coupled to or included in computing platforms used to access the video game, wherein the individual physical objects are associated with individual game entities by virtue of the detection of the individual physical objects causing the associated individual game entities to be instantiated into the video game, the user video game accounts including:
a first user video game account of a first user, the first user video game account including a first account-specific value for a first attribute, the first attribute being the physical object identification attribute, the first account-specific value specifying a first unique identification of a first physical object, the first physical object being associated with a first game entity such that the first physical object embodies a visual appearance of the first game entity and causes, based on detection of the first physical object by an individual reader coupled to or included in an individual computing platform, the first game entity to be instantiated into the video game;
selecting one or more attributes, including selecting the first attribute;
determining one or more winning values for the one or more selected attributes, the one or more winning values determined from a pool of values for the one or more selected attributes included in the user video game accounts, including determining a first winning value from a first pool of values for the first attribute, the first pool of values including values for the first attribute included in the user video game accounts of multiple users such that the first pool of values includes a pool of unique identifications of physical objects associated with the user video game accounts of the multiple users;

associating one or more awards with one or more winning values, including associating a first award with the first winning value; and providing the one or more awards to one or more winning user video game accounts based on values for the selected one or more attributes included in the one or more winning user video game accounts matching the one or more winning values and the one or more winning user video game accounts conveying satisfaction of award redemption criteria, including providing the first award to the first user video game account based on the first account-specific value matching the first winning value and the first user video game account conveying satisfaction of first award redemption criteria, the first award redemption criteria including the user video game accounts conveying detection, at one or more specified times, of the physical objects by the readers operatively coupled to or included in the computing platforms used to access the video game, such that responsive to the first user video game account conveying detection of the first physical object by a first reader operatively coupled to or included with a first computing platform at a first specified time, the first award redemption criteria is satisfied.

10. The method of claim 9, wherein one of the selected one or more winning values corresponds to only one user video game account.

11. The method of claim 9, additionally comprising:

identifying one or more potential winning user video game accounts, the potential winning user video game accounts including values for the one or more selected attributes that match the one or more winning values for the one or more selected attributes, including identifying the first user video game account as a first potential winning account based on the first account-specific value matching the first winning value.

12. The method of claim 9, wherein the one or more attributes further include a biometric reading attribute, values of the biometric reading attribute specifying information derived from readings of biometric markers of the users of the user video game accounts, and wherein a second pool of values for the biometric reading attribute includes unique information derived from readings of biometric markers of the multiple users.

13. The method of claim 9, wherein the one or more attributes further include a user identification attribute, values of the user identification attribute specifying unique identifications of the user video game accounts associated with the users, and wherein a second pool of values for the user identification attribute includes unique identifications of the user video game accounts.

14. The method of claim 9, wherein the award redemption criteria further includes the user video game accounts conveying users are logged into the user video game accounts at one or more specified times.

15. The method of claim 9, wherein the award redemption criteria further includes the user video game accounts conveying biometric readings of biometric markers of the users at one or more specified times.

16. The method of claim 9, wherein the awards are provided to one or more winning user video game accounts in accordance with periodic awarding events that take place in the video game.

* * * * *